O. A. BOEHM.
BOWL OR TUREEN.
APPLICATION FILED NOV. 10, 1908.
927,102.
Patented July 6, 1909.
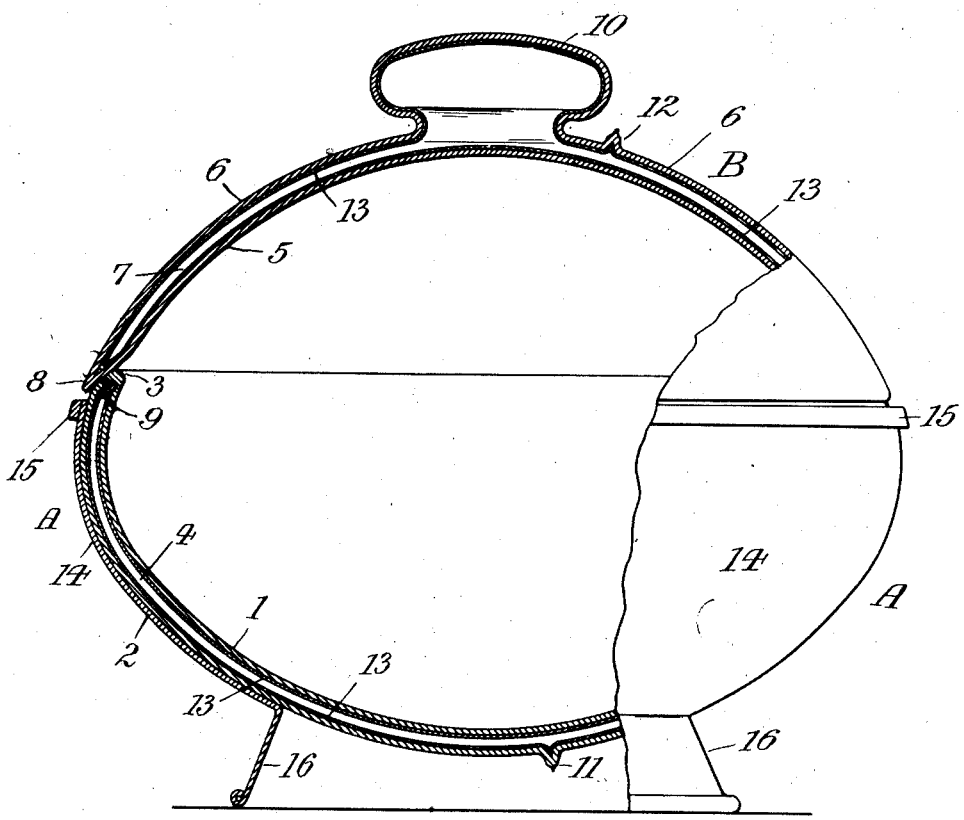
Witnesses:
W. R. Schulz.
Edw Schorr.
Inventor
Oscar A. Boehm,
By his Attorney Arthur E. Gump.

UNITED STATES PATENT OFFICE.

OSCAR A. BOEHM, OF NEW YORK, N. Y.

BOWL OR TUREEN.

No. 927,102.  Specification of Letters Patent.  Patented July 6, 1909.

Application filed November 10, 1908. Serial No. 461,867.

*To all whom it may concern:*

Be it known that I, OSCAR A. BOEHM, a citizen of the United States, residing at New York city, Manhattan, county of New York, State of New York, have invented new and useful Improvements in Bowls or Tureens, of which the following is a specification.

This invention relates to a covered bowl or tureen consisting essentially of two sections. viz: a lower section or bowl proper, and an upper section or lid adapted to tightly fit upon the lower section. Both sections are preferably made of hard glass, and are provided with double walls, between which vacuum chambers are formed. The lower section is, when desired, inclosed within a correspondingly shaped metal basket or casing to protect it against breaking and to provide a proper support for the bowl. The joint between both sections should be such that any communication between the interior of the vessel and the outer air is effectively prevented.

My improved covered bowl provides reliable means for preserving meals etc., in such a manner that they retain their temperature for a considerable length of time, but it is obvious that the bowl may also be used for other purposes.

In the accompanying drawing which is a vertical cross section, partly in view, through one form of a curved bowl embodying my invention, the letter A indicates the bottom section or bowl proper, while the letter B designates the upper section or lid. Bowl A comprises an inner curved wall 1, and an outer curved wall 2, the shape of which corresponds, substantially, to that of wall 1. Walls 1 and 2, being connected along their upper rim as at 3, are preferably made of a single piece of glass, and their sizes are such that a comparatively narrow chamber 4 is formed between them. Wall 1 as well as wall 2 is shown to be so bulged or curved that its cross section forms a figure slightly larger than a half-ellipse, or in other words, the upper rim of section A is drawn inward to form a contracted neck, although said section may be of any other convenient shape, without departing from the spirit of my invention.

Lid B comprises an inner curved wall 5, and an outer curved wall 6, which are so spaced that a narrow chamber 7 is formed between them. Walls 5 and 6 are connected along their lower rim as at 8, and are also preferably made of a single piece of glass. Rim 8 is beveled to engage a corresponding bevel 9 of edge 3, and thereby form a tight joint. At its apex, wall 6 is bulged outward to form a vacuum insulated handle or knob 10. It is obvious that the coöperating edges 3 and 8 of sections A and B may be of any other shape or construction in order to produce the desired joint, as long as they answer the purpose of preventing any communication between the interior of the bowl and the outer air.

Chambers 4 and 7 are evacuated, for which purpose walls 2 and 6 are provided with tubular projections or teats 11 and 12 respectively, which are sealed after the air has been exhausted from said chambers. The inner sides of walls 1, 2 and 5, 6, that form the vacuum chambers 4 and 7 respectively, are preferably provided with a lining of metallic silver or other suitable coating 13.

Bowl A is partly inclosed within a metal casing or other basket 14, that snugly embraces said bowl. At its upper edge, basket 14 is reinforced by a ring 15, which simultaneously forms a guard for the lower edge of lid B, when placing the latter upon bowl A. Basket 14 is slightly drawn or spun inward at its upper edge, to correspond to the shape of the bowl, so that a disengagement of the latter from the basket is prevented. At its bottom, basket 14 has a downwardly extending rim 16, constituting the foot of the basket. It is obvious that the shape of the supporting basket 14, and the means for securely holding the same to pan A may be varied, without departing from the spirit of my invention.

It will be seen, that by the construction described, a covered bowl or tureen is provided the interior of which is readily accessible for introducing and taking out the meals or other contents thereof, and also for cleaning purposes. When the bowl is properly closed by placing the vacuum insulated lid upon the lower section, the contents of the bowl will retain their temperature for a considerable length of time.

I claim:

1. As a new article of manufacture, a vacuum insulated bowl, a vacuum insulated lid adapted to be seated upon the bowl, a metal basket snugly embracing the bowl, means for securely holding the basket to the bowl, and a foot formed on said basket.

2. As a new article of manufacture, a vacuum insulated bowl having a contracted upper edge, a vacuum insulated lid adapted to be seated upon the bowl-edge, a metal basket snugly embracing the bowl and having a reinforcing rim arranged slightly below the bowl-edge, said rim constituting a guard for the lid, and a foot formed on the basket.

3. As a new article of manufacture, a glass bowl comprising an inner wall and an outer wall having a vacuum space therebetween, a glass lid removably engaging the bowl and comprising an inner wall and an outer wall having a vacuum space therebetween, and an outwardly extending bulge formed on the outer lid-wall, said bulge constituting a vacuum insulated handle.

4. As a new article of manufacture, a glass bowl comprising a pair of silver lined walls having a vacuum space therebetween, a glass lid removably engaging the bowl and comprising an inner silver lined wall and an outer silver lined wall having a vacuum space therebetween, an outwardly extending silver lined bulge formed at the apex of the outer lid wall, said bulge constituting a vacuum insulated handle, and means for providing a tight joint between bowl and lid.

Signed by me at New York, N. Y., this seventh day of November 1908.

OSCAR A. BOEHM.

Witnesses:
GERTRUDE M. KENNEY,
ARTHUR E. ZUMPE.